(12) United States Patent
Kim et al.

(10) Patent No.: US 9,222,778 B2
(45) Date of Patent: Dec. 29, 2015

(54) APPARATUS AND METHOD FOR PROVIDING NAVIGATION SERVICE IN ELECTRONIC DEVICE

(71) Applicant: Samsung Electronics Co. Ltd., Suwon-si, Gyeonggi-do (KR)

(72) Inventors: Sung-Chan Kim, Suwon-si (KR); Jung-Hwan Ku, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 13/716,545

(22) Filed: Dec. 17, 2012

(65) Prior Publication Data

US 2013/0231859 A1    Sep. 5, 2013

(30) Foreign Application Priority Data

Mar. 2, 2012  (KR) .......................... 10-2012-0021845

(51) Int. Cl.
*G01C 21/00* (2006.01)
*G01C 21/34* (2006.01)
*G01C 21/36* (2006.01)

(52) U.S. Cl.
CPC .............. *G01C 21/00* (2013.01); *G01C 21/362* (2013.01)

(58) Field of Classification Search
CPC .... G01C 21/00; G01C 21/343; G01C 21/362; G08G 1/096838; G08G 1/096844
USPC ........................... 701/468, 400, 408, 465, 527
See application file for complete search history.

(56) References Cited

U.S. PATENT DOCUMENTS

| | | | | |
|---|---|---|---|---|
| 5,787,383 A * | 7/1998 | Moroto et al. | ................ | 701/418 |
| 5,924,075 A * | 7/1999 | Kanemitsu | ........................ | 705/6 |
| 5,940,803 A * | 8/1999 | Kanemitsu | ........................ | 705/6 |
| 7,689,595 B2 * | 3/2010 | Boss et al. | ............. | 707/999.107 |
| 7,698,062 B1 * | 4/2010 | McMullen et al. | ........... | 701/438 |
| 8,000,694 B2 * | 8/2011 | Labidi et al. | .................. | 455/418 |
| 8,676,273 B1 * | 3/2014 | Fujisaki | ........................ | 455/567 |
| 8,831,873 B2 * | 9/2014 | Tamayama et al. | ........... | 701/410 |
| 2002/0082771 A1 * | 6/2002 | Anderson | ..................... | 701/209 |
| 2005/0195154 A1 | 9/2005 | Robbins et al. | | |
| 2006/0047424 A1 | 3/2006 | Ishikawa et al. | | |
| 2006/0058948 A1 * | 3/2006 | Blass et al. | .................... | 701/207 |

(Continued)

FOREIGN PATENT DOCUMENTS

| | | | |
|---|---|---|---|
| KR | 10-2009-0051340 A | | 5/2009 |
| KR | 10-2011-0062077 A | | 6/2011 |
| KR | 10-2011-0066821 A | | 6/2011 |

OTHER PUBLICATIONS

GoTime1, http://itunes.apple.com/app/gotime/id463305124.*

(Continued)

*Primary Examiner* — Calvin Cheung
*Assistant Examiner* — Angelina Shudy
(74) *Attorney, Agent, or Firm* — Jefferson IP Law, LLP

(57) ABSTRACT

An apparatus and method for providing navigation service in an electronic device are provided. A method for providing navigation service in an electronic device includes determining whether candidate schedule information settable as a destination for navigation service among at least one schedule information exists and, when at least one candidate schedule information settable as the destination for navigation service exists, setting the destination for navigation service considering the at least one candidate schedule information.

14 Claims, 12 Drawing Sheets

(56) References Cited

U.S. PATENT DOCUMENTS

| | | | |
|---|---|---|---|
| 2006/0089787 A1* | 4/2006 | Burr et al. | 701/202 |
| 2006/0241862 A1* | 10/2006 | Ichihara et al. | 701/209 |
| 2007/0197231 A1* | 8/2007 | Lin | 455/456.1 |
| 2008/0046298 A1* | 2/2008 | Ben-Yehuda et al. | 705/6 |
| 2008/0086455 A1* | 4/2008 | Meisels et al. | 707/3 |
| 2008/0167937 A1* | 7/2008 | Coughlin et al. | 705/9 |
| 2009/0150067 A1* | 6/2009 | Lindman | 701/204 |
| 2009/0157297 A1* | 6/2009 | Hagiwara | 701/201 |
| 2009/0158200 A1* | 6/2009 | Palahnuk et al. | 715/781 |
| 2010/0179753 A1* | 7/2010 | Agarwal et al. | 701/204 |
| 2010/0299061 A1* | 11/2010 | Chao | 701/201 |
| 2011/0077860 A1* | 3/2011 | Coughlin et al. | 701/204 |
| 2011/0161001 A1* | 6/2011 | Fink | 701/201 |
| 2011/0257881 A1* | 10/2011 | Chen et al. | 701/204 |
| 2011/0301841 A1* | 12/2011 | Schuurbiers et al. | 701/204 |
| 2011/0307280 A1* | 12/2011 | Mandelbaum | 705/6 |
| 2012/0059578 A1* | 3/2012 | Venkatraman | 701/411 |
| 2012/0209506 A1* | 8/2012 | Tamayama et al. | 701/410 |
| 2012/0254763 A1* | 10/2012 | Protopapas et al. | 715/738 |
| 2013/0151149 A1* | 6/2013 | Kristinsson et al. | 701/533 |
| 2013/0238241 A1* | 9/2013 | Chelotti et al. | 701/533 |
| 2013/0268195 A1* | 10/2013 | Tai et al. | 701/533 |
| 2014/0278070 A1* | 9/2014 | McGavran et al. | 701/465 |
| 2014/0278086 A1* | 9/2014 | San Filippo et al. | 701/527 |
| 2014/0365107 A1* | 12/2014 | Dutta et al. | 701/408 |
| 2015/0057837 A1* | 2/2015 | Moore, Jr. | 701/2 |

OTHER PUBLICATIONS

GoTime2, http://www.50ply.com/.*
GoTime3, http://www.50ply.com/gotime.html.*

* cited by examiner

FIG.7A

APPARATUS AND METHOD FOR PROVIDING NAVIGATION SERVICE IN ELECTRONIC DEVICE

PRIORITY

This application claims priority under 35 U.S.C. §119(a) of a Korean patent application filed on Mar. 2, 2012 in the Korean Intellectual Property Office and assigned Serial No. 10-2012-0021845, the entire disclosure of which is hereby incorporated by reference.

BACKGROUND OF THE INVENTION

1. Field of the Invention

The present invention relates to an apparatus and method for providing a navigation service in an electronic device. More particularly, the present invention relates to an apparatus and method for setting a destination for navigation service in an electronic device.

2. Description of the Related Art

As the number of users of portable terminals continues to increase, service providers of the portable terminals are providing various services to secure (e.g., attract) more users. For example, in addition to a general calling function, the portable terminals provide various services such as an electronic scheduler, an Internet search, a digital multimedia broadcasting reception, a streaming service, a video play, a game, a schedule information management, a navigation service, and the like.

The navigation service represents a service of showing a route from a current location to a destination using a Global Navigation Satellite System (GNSS). For example, when a user of a portable terminal sets a destination for navigation service, the portable terminal estimates a current location of the portable terminal using a satellite signal received from a GNSS satellite. Thereafter, the portable terminal shows a route from the current location, which is estimated using the satellite signal, to a destination set by the user.

As described above, when providing a navigation service, a portable terminal shows a route from a current location to a destination set by a user. As such, the portable terminal confirms the destination set by the user so as to provide the navigation service. According to this, there is a disadvantage associated with the user of the portable terminal having to set the destination in person whenever using the navigation service.

Therefore, a need exists for an apparatus and method for providing navigation service in an electronic device. In addition, a need exists for an apparatus and method for setting a destination for navigation service in an electronic device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above problems and/or disadvantages and to provide at least the advantages described below. Accordingly, an aspect of the present invention is to provide an apparatus and method for providing navigation service in an electronic device.

Another aspect of the present invention is to provide an apparatus and method for setting a destination for navigation service in an electronic device.

Another aspect of the present invention is to provide an apparatus and method for interlocking navigation service and schedule information in an electronic device.

Another aspect of the present invention is to provide an apparatus and method for setting a destination for navigation service considering schedule information in an electronic device.

The above aspects are achieved by providing an apparatus and method for providing navigation service in an electronic device.

In accordance with an aspect of the present invention, a method for providing navigation service in an electronic device is provided. The method includes determining whether candidate schedule information settable as a destination for navigation service among at least one schedule information exists and, when at least one candidate schedule information settable as the destination for navigation service exists, setting the destination for navigation service considering the at least one candidate schedule information.

In accordance with another aspect of the present invention, an apparatus for providing navigation service in an electronic device is provided. The apparatus includes a storage unit for storing at least one schedule information, and a navigation module for, when at least one candidate schedule information settable as a destination for navigation service among the at least one schedule information stored in the storage unit exists, setting the destination for navigation service considering the at least one candidate schedule information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following description taken in conjunction with the accompanying drawings, in which:

FIGS. 7A to 7C are diagrams illustrating a screen configuration for setting a destination for navigation service in an electronic device according to the third exemplary embodiment of the present invention.

Throughout the drawings, like reference numerals will be understood to refer to like parts, components, and structures.

DETAILED DESCRIPTION OF THE PREFERRED EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Preferred exemplary embodiments of the present invention will be described herein below with reference to the accompanying drawings. In the following description, well-known functions or constructions are not described in detail because such a description may obscure the exemplary embodiments of the present invention in unnecessary detail. Terms described below, which are defined considering functions in exemplary embodiments of the present invention, can be different depending on user and operator's intention or practice. Therefore, the terms should be defined on the basis of the disclosure throughout this specification.

Exemplary embodiments of the present invention describe a technology for providing navigation service in an electronic device.

In the following description, the electronic device includes a mobile communication terminal capable of providing schedule service and navigation service, a smart phone, a Personal Digital Assistant (PDA), a Mobile Internet Device (MID), a laptop, an Ultra Mobile Personal Computer (UMPC), a tablet Personal Computer (PC), a netbook, a navigation, an MPEG-1 Audio Layer 3 (MP3), a Portable Multimedia Player (PMP), and the like.

Figure 1:
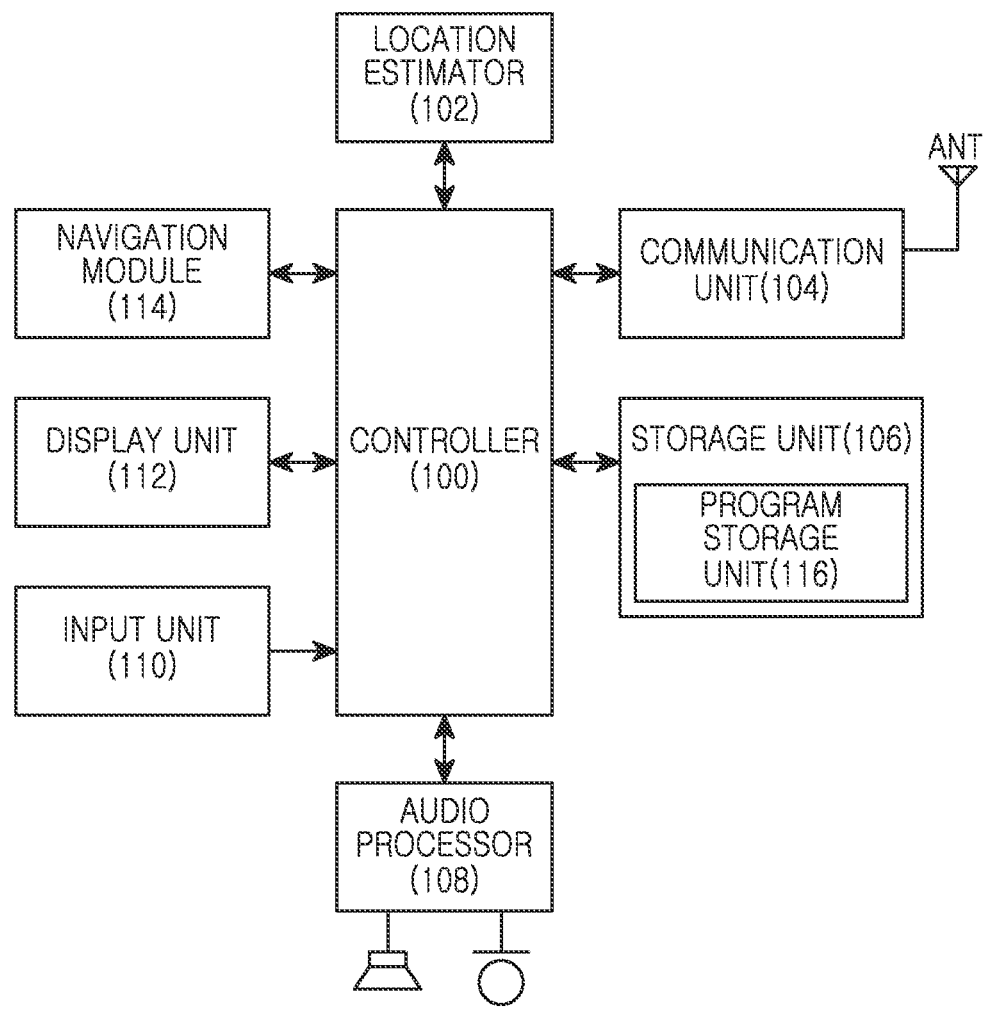
FIG. 1 is a block diagram illustrating a construction of an electronic device according to an exemplary embodiment of the present invention.

FIG. 1 is a block diagram illustrating a construction of an electronic device according to an exemplary embodiment of the present invention.

Referring to FIG. 1, the electronic device includes a controller 100, a location estimator 102, a communication unit 104, a storage unit 106, an audio processor 108, an input unit 110, a display unit 112, and a navigation module 114.

According to exemplary embodiments of the present invention, the controller 100 controls the operation of the electronic device. As an example, the controller 100 may control the whole operation of the electronic device.

The controller 100 controls to store and manage schedule information. For example, when a schedule management application program is executed, the controller 100 controls to display an input window for schedule information on the display unit 112. Thereafter, the controller 100 controls to store the schedule information input through the input window, in the storage unit 106.

The controller 100 controls the navigation module 114 to provide navigation service. For example, the controller 100 controls the navigation module 114 to set a destination for navigation service considering schedule information. At this time, the controller 100 provides the schedule information stored in the storage unit 106, to the navigation module 114.

Figure 4:
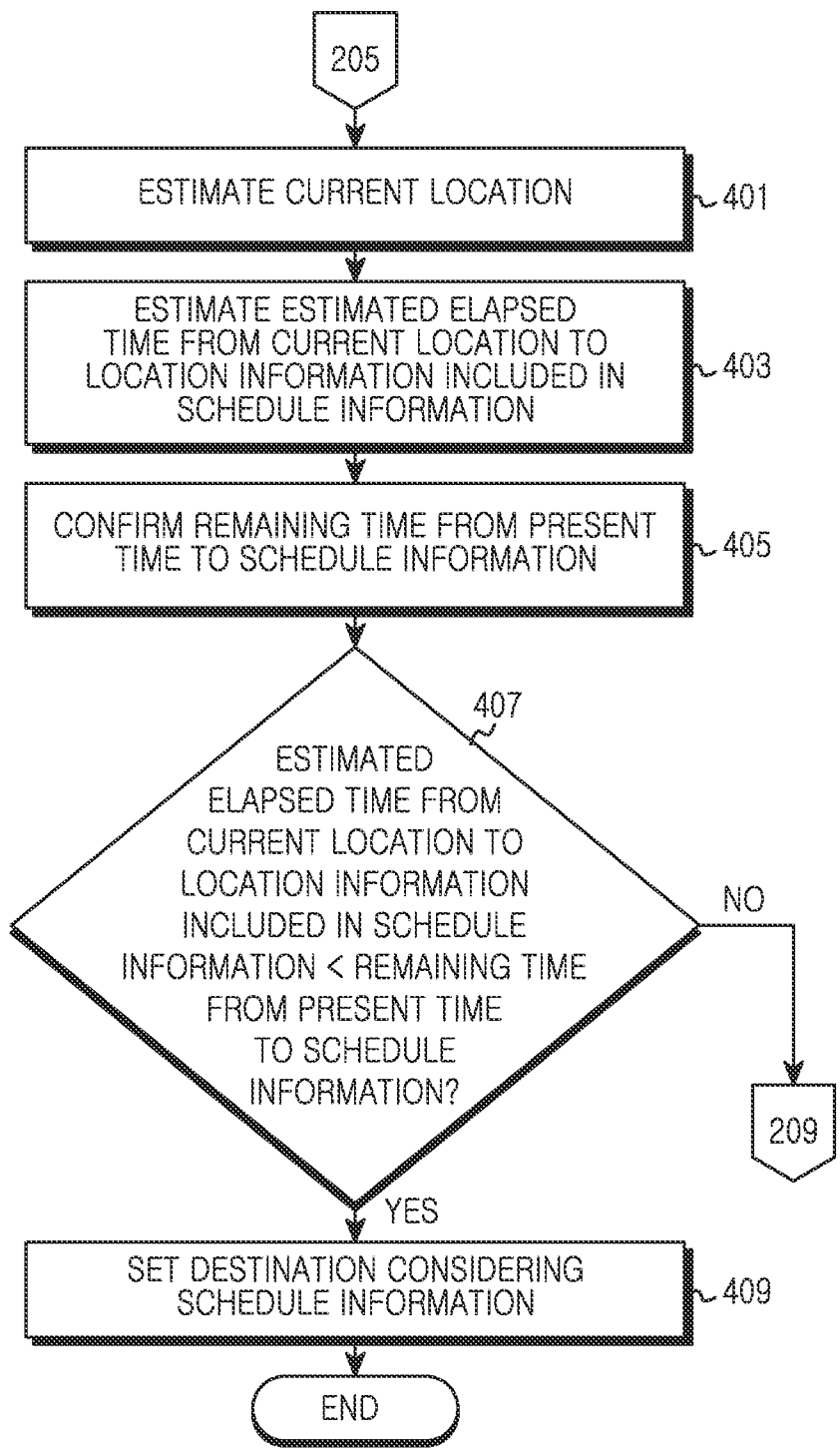
FIG. 4 is a flowchart illustrating a procedure for setting a destination for navigation service considering schedule information in an electronic device according to a second exemplary embodiment of the present invention.
Figure 6:
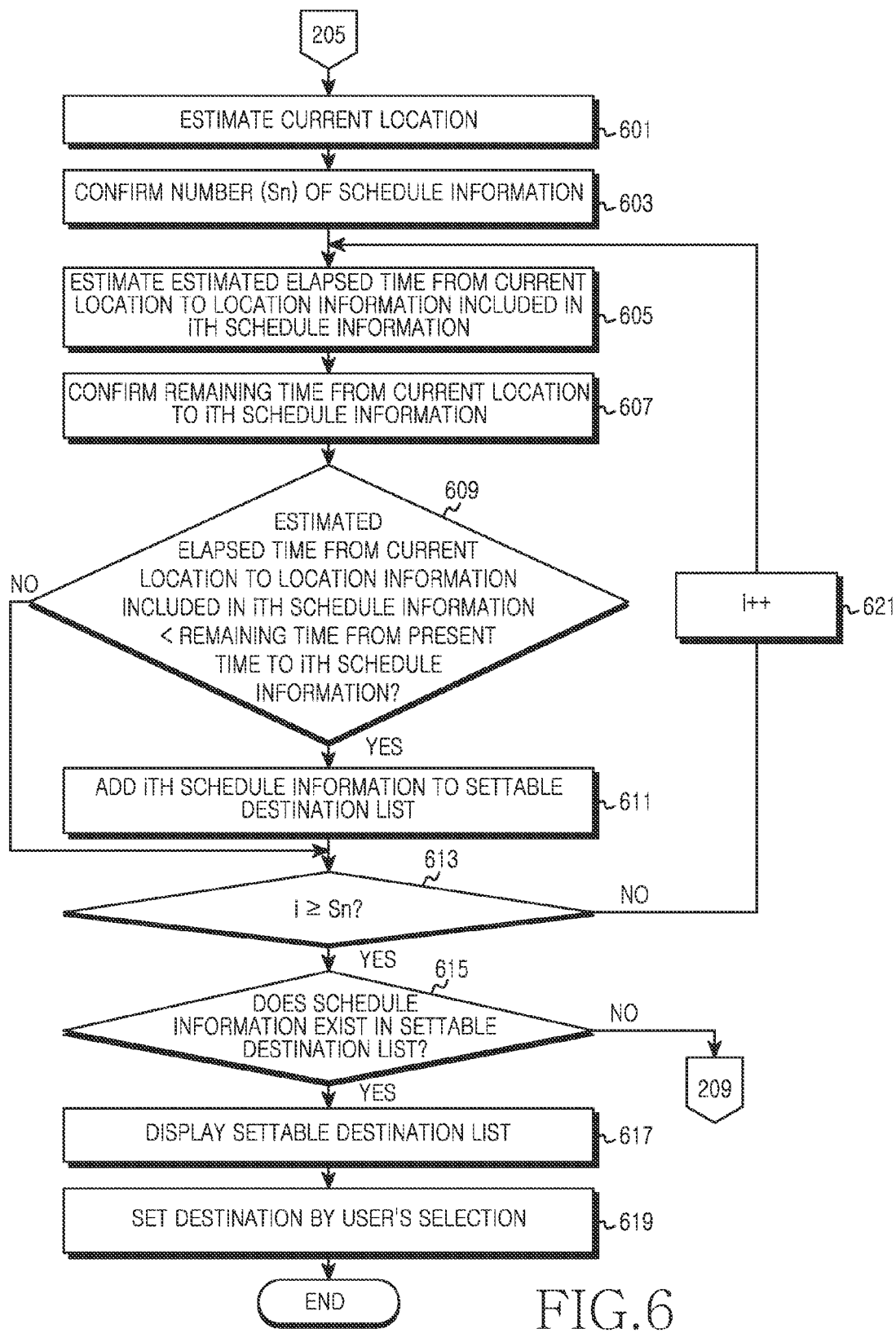
FIG. 6 is a flowchart illustrating a procedure for setting a destination for navigation service considering schedule information in an electronic device according to a third exemplary embodiment of the present invention.
Figure 8:
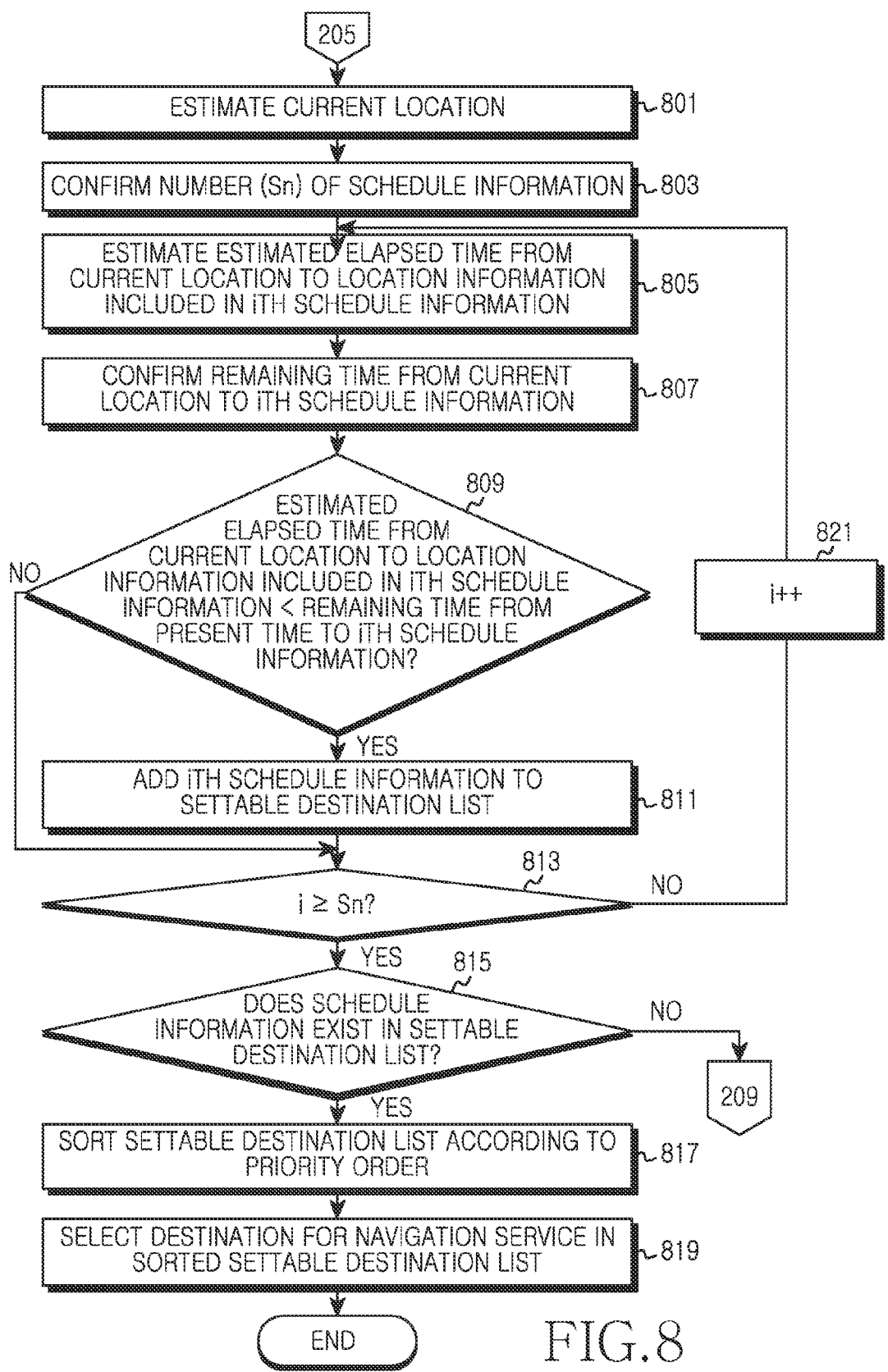
FIG. 8 is a flowchart illustrating a procedure for setting a destination for navigation service considering schedule information in an electronic device according to an exemplary embodiment of the present invention.

The navigation module 114 provides navigation service according to control of the controller 100. At this time, the navigation module 114 sets a destination for navigation service considering schedule information provided from the controller 100. For example, when schedule information settable as a destination for navigation service exists, as illustrated in FIG. 4 below, the navigation module 114 estimates an estimated elapsed time from a current location to location information included in the schedule information. Thereafter, the navigation module 114 sets the destination for navigation service considering the estimated elapsed time up to the location information included in the schedule information. As another example, when schedule information settable as a destination for navigation service exists in plural, as illustrated in FIG. 6 below, the navigation module 114 estimates an estimated elapsed time up to location information included in each schedule information. Thereafter, the navigation module 114 sets at least one destination for navigation service considering the estimated elapsed time up to the location information included in each schedule information. As yet another example, when schedule information included in a destination list settable as a destination for navigation service exists in plural, as illustrated in FIG. 8 below, the navigation module 114 sets a destination for navigation service considering a priority order of the schedule information included in the destination list. The priority order is determined considering at least one of a distance from a location of the electronic device to location information included in schedule information settable as a destination for navigation service, an estimated elapsed time from the location of the electronic device to the location information included in the schedule information settable as the destination for navigation service, and the remaining time to the schedule information settable as the destination for navigation service of the electronic device. According to exemplary embodiments of the present invention, the navigation module 114 may automatically set the at least one destination for navigation service.

When the navigation module 114 does not provide navigation service, the navigation module 114 may be inactivated according control of the controller 100. In this case, the navigation module 114 may be activated according to control of the controller 100 for the sake of a navigation application program service.

The location estimator 102 estimates a current location of the electronic device. For example, the location estimator 102 estimates the current location of the electronic device using a satellite signal received from a Global Navigation Satellite System (GNSS) satellite. As another example, the location estimator 102 may estimate the current location of the electronic device using a triangulation scheme. As yet another example, the location estimator 102 may estimate the current location of the electronic device using a Wireless Local Area Network (WLAN) service. According to exemplary embodiments of the present invention, the location estimator 102 may receive signals with which the current location of the electronic device is estimated. The controller 100 may estimate the current location of the electronic device based on such signals. As another example, the location estimator 102 may be integrated with the controller 110. For example, the controller may be configured to estimate the current location of the electronic device.

The communication unit 104 processes a signal transceived through an antenna, for voice and data communication.

The storage unit 106 may comprise a program storage unit 116 for storing a program for controlling the operation of the electronic device and a data storage unit for storing data generated during program execution. For example, the data storage unit stores schedule information by user's input according to control of the controller 100. The data storage unit provides the schedule information to the navigation module 114 through the controller 100 so that the navigation module 114 can set a destination for navigation service. Also, the data storage unit can store a destination list having been set by a user according to control of the controller 100. As another example, the program storage unit 116 may store an instruction set or program as a set of instructions for providing navigation service in the controller 100.

The audio processor 108 controls input/output of an audio signal. For example, the audio processor 108 transmits an audio signal provided from the controller 100, to the external through a speaker, and provides an audio signal provided from a microphone, to the controller 100.

The input unit 110 provides input data generated by user's selection to the controller 100. For example, the input unit 110 includes a button for control of the electronic device. For another example, the input unit 110 may include a keypad for receiving input data from a user, apart from the display unit 112. Such an input unit 110 may be formed by one or a combination of input means such as a touch pad, a touchscreen, a button-type key pad, a joystick, a wheel key, and the like.

The display unit 112 performs a function of information display. The display unit 112 may display state information of the electronic device, a character input by a user, a moving picture, a still picture and the like according to control of the controller 100.

In a case in which the display unit 112 is composed of a touch screen, the display unit 112 provides input data provided through the touch screen, to the controller 100.

In the aforementioned construction, the controller 100 can perform a function of the navigation module 114. According to exemplary embodiments of the present invention, these are separately constructed and shown in order to distinguish and describe respective functions. However, in actual realization, construction can be such that all or some of the functions of the navigation module 114 are processed in the controller 100.

In the aforementioned exemplary embodiment of the present invention, the navigation module 114 is provided with schedule information stored in the storage unit 106, through the controller 100.

In another exemplary embodiment of the present invention, the navigation module 114 may be provided with schedule information directly from the storage unit 106.

Figure 2:
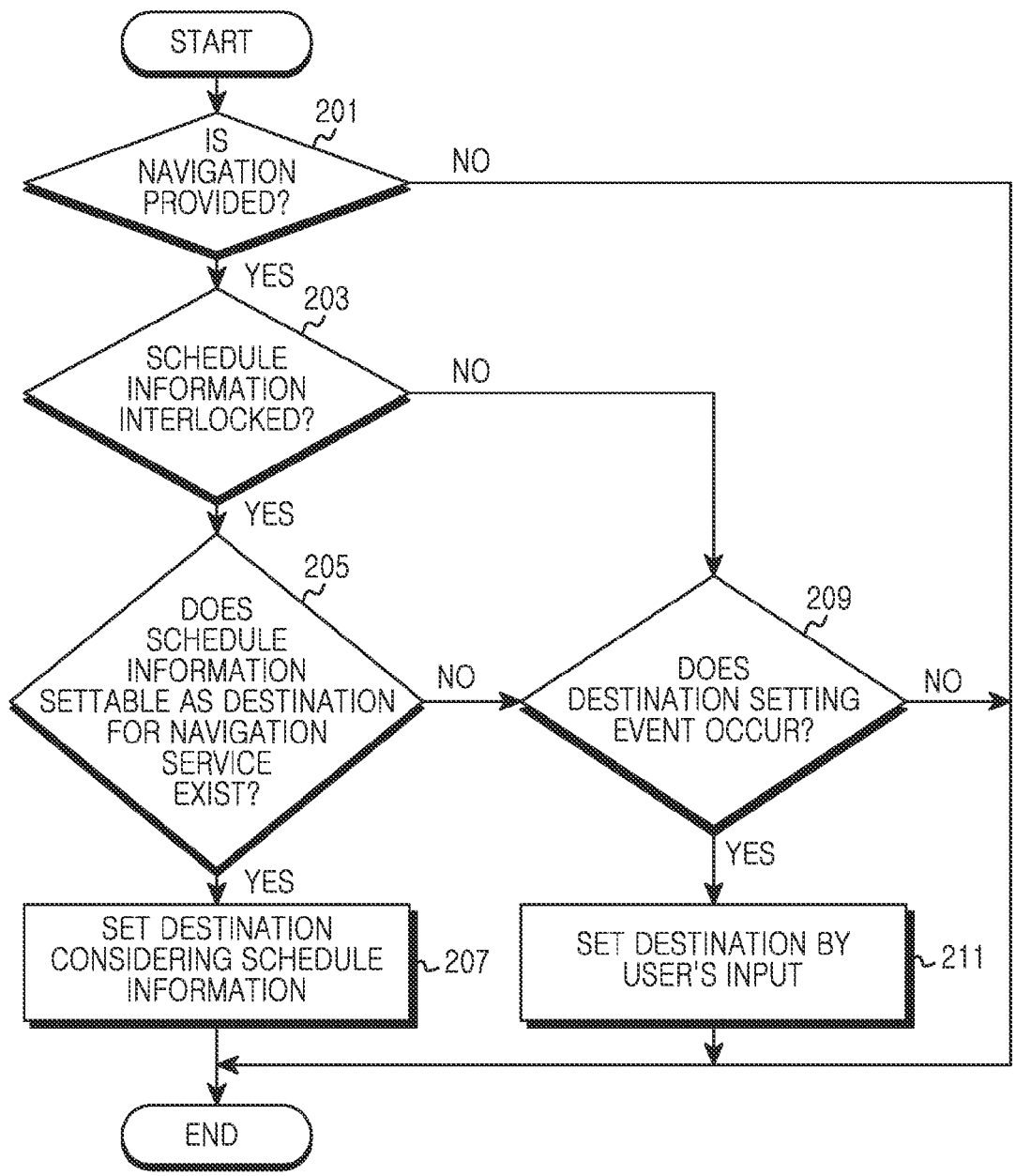
FIG. 2 is a flowchart illustrating a procedure for setting a destination for navigation service in an electronic device according to a first exemplary embodiment of the present invention.

FIG. 2 illustrates a procedure for setting a destination for navigation service in an electronic device according to a first exemplary embodiment of the present invention.

Referring to FIG. 2, in step 201, the electronic device determines whether to provide navigation service. For example, the electronic device determines whether an application program for navigation service is executed by user's manipulation.

If the electronic device determines that the navigation service is not to be provided in step 201, the electronic device terminates the algorithm according to an exemplary embodiment of the present invention.

In contrast, if the electronic device determines that the navigation service is to be provided in step 201, the electronic device proceeds to step 203. In step 203, the electronic device determines whether to provide the navigation service considering schedule information. For example, the electronic device confirms preset information about interlocking between the schedule information stored in the storage unit 106 and the navigation service. As another example, if the electronic device determines that the navigation service is to be provided, the electronic device displays an interlocking setting menu for checking interlocking or non-interlocking between the schedule information and the navigation service. Thereafter, the electronic device can determine whether a user sets the interlocking or non-interlocking between the schedule information and the navigation service through the interlocking setting menu. At this time, when the electronic device determines that the user provides a selection on the interlocking setting menu during a constant time, the electronic device may recognize the selection as corresponding to interlocking the schedule information and the navigation service. Conversely, the electronic device may recognize the selection as corresponding to non-interlocking the schedule information and the navigation service.

If the electronic device determines that the navigation service is to be provided without considering the schedule information in step 203, the electronic device proceeds to step 209. In step 209, the electronic device determines whether a destination setting event takes place. For example, the electronic device displays an input window for a user to input a keyword and set a destination for navigation service. Thereafter, the electronic device determines whether destination information for navigation service is input through the input window. As another example, the electronic device displays a destination list having been set by a user. Thereafter, the electronic device may determine whether at least one destination is selected from the destination list.

If the electronic device determines that the destination setting event does not take place in step 209, the electronic device terminates the algorithm according to the present invention. For example, after the input window for destination setting is displayed, if destination information is not input through the input window during a reference time, the electronic device recognizes that it does not set the destination for navigation service. As another example, after the destination list is displayed, if at least one destination is not selected from the destination list during a reference time, the electronic device may recognize that it does not set the destination for navigation service.

In contrast, if the electronic device determines that the destination setting event takes place in step 209, the electronic device proceeds to step 211. In step 211, the electronic device sets a destination for navigation service considering user's input. For example, the electronic device sets the destination for navigation service according to destination information input through the input window displayed on the display unit 112 for destination setting. For another example, the electronic device can set the destination for navigation service considering at least one destination selected by a user from the destination list.

In contrast, if the electronic device determines that the navigation service is to be provided considering the schedule information in step 203, the electronic device proceeds to step 205. In step 205, the electronic device determines whether schedule information settable as a destination for navigation service exists. For example, the electronic device confirms schedule information after the present time among the schedule information stored in the storage unit 106. Thereafter, the electronic device determines whether schedule information including location information exists among the schedule information after the present time.

If the electronic device determines that the schedule information settable as the destination for navigation service does not exist in step 205, the electronic device proceeds to step 209. In step 209, the electronic device determines whether the destination setting event occurs.

In contrast, if the electronic device determines that the schedule information settable as the destination for navigation service exists in step 205, the electronic device proceeds to step 207. In step 207, the electronic device sets the destination for navigation service considering the schedule information settable as the destination for navigation service.

Figure 3A:
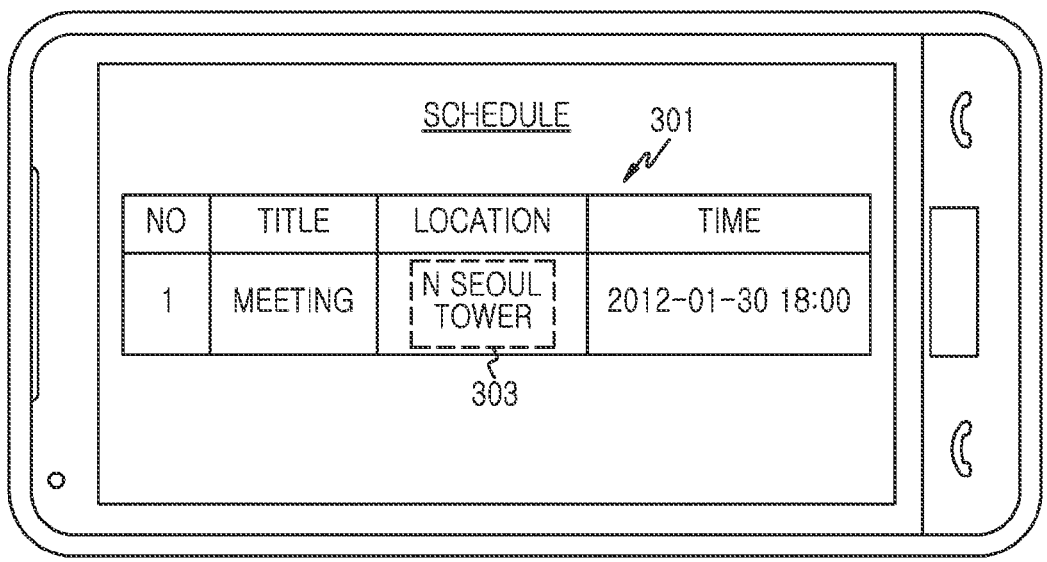
FIGS. 3A and 3B are diagrams illustrating a screen configuration for setting a destination for navigation service in an electronic device according to the first exemplary embodiment of the present invention.
Figure 3B:
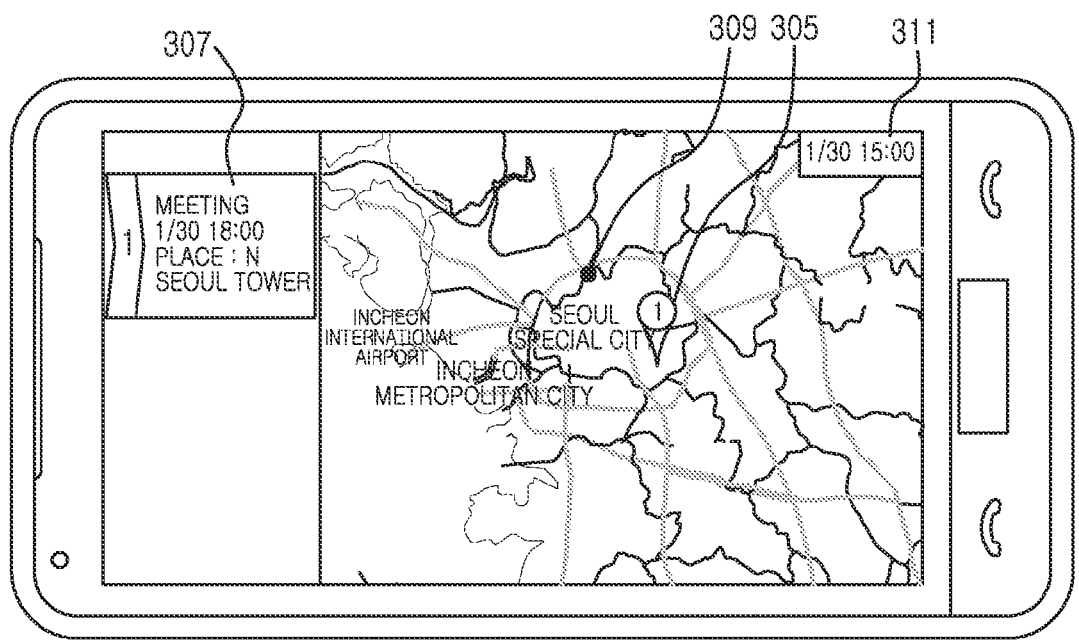

FIGS. 3A and 3B are diagrams illustrating a screen configuration for setting a destination for navigation service in an electronic device according to the first exemplary embodiment of the present invention.

Referring to FIGS. 3A and 3B, as an example of the electronic device setting the destination for navigation service considering the schedule information settable as the destination for navigation service in step 207, when schedule information 301 for meeting in 'N' Seoul Tower at 18:00 on January 30th 2012 illustrated in FIG. 3A is settable as a destination for navigation service, the electronic device sets 'N' Seoul Tower, which is location information 303 included in the schedule information 301, as a destination 305 for navigation service as illustrated in FIG. 3B. At this time, as illustrated in FIG. 3B, the electronic device displays a navigation service screen including a destination list 307 settable as a destination for navigation service, a current location 309 of the electronic device, the present time 311, the destination 305 for navigation service, and the like.

Thereafter, the electronic device terminates the algorithm according to exemplary embodiments of the present invention.

In the aforementioned exemplary embodiment of the present invention, the electronic device sets a destination for navigation service considering schedule information. At this time, the electronic device sets the destination for navigation service considering an estimated elapsed time up to location information included in the schedule information as illustrated in FIG. 4 below.

Figure 5A:
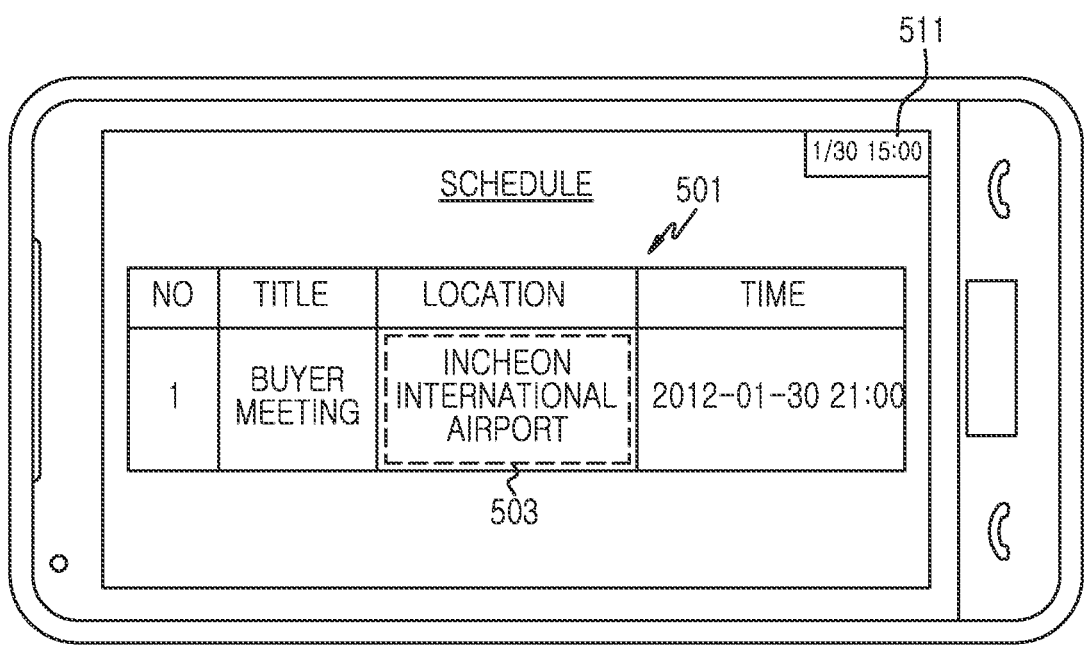
FIGS. 5A and 5B are diagrams illustrating a screen configuration for setting a destination for navigation service in an electronic device according to the second exemplary embodiment of the present invention.
Figure 5B:
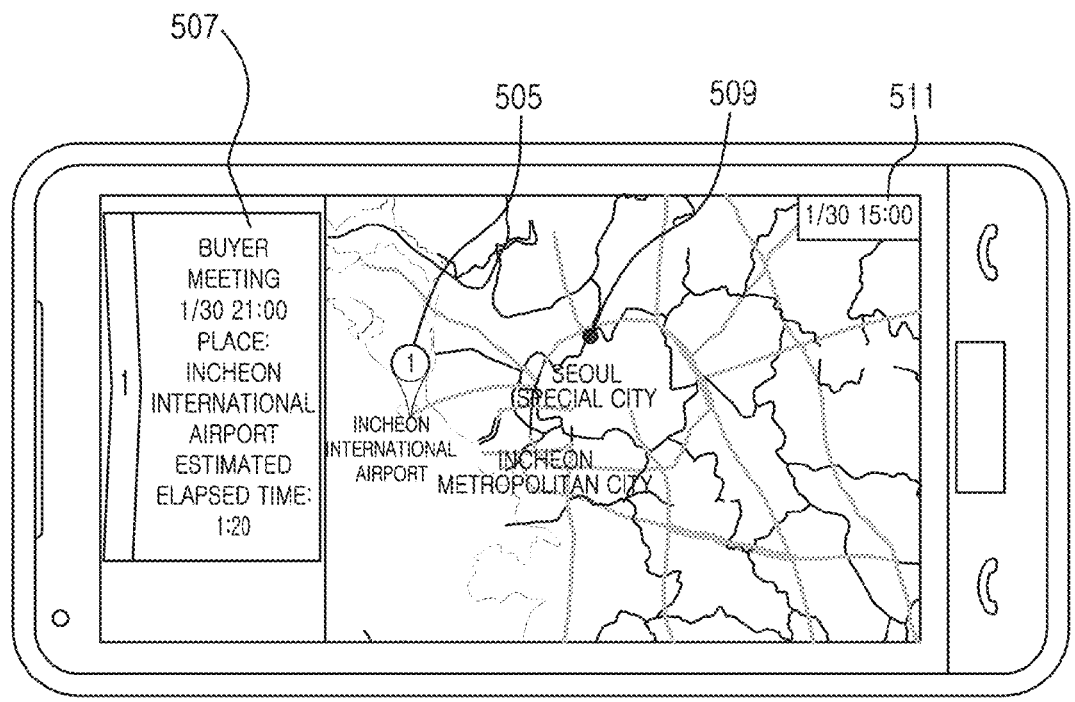

FIG. 4 illustrates a procedure for setting a destination for navigation service considering schedule information in an electronic device according to a second exemplary embodiment of the present invention. FIGS. 5A and 5B are diagrams illustrating a screen configuration for setting a destination for navigation service in an electronic device according to the second exemplary embodiment of the present invention.

Referring to FIGS. 4, 5A, and 5B, if the electronic device determines that schedule information settable as a destination for navigation service exists in step 205 of FIG. 2, then in step 401, the electronic device estimates a current location of the electronic device. For example, the electronic device estimates the current location of the electronic device using a satellite signal received from a GNSS satellite. As another example, the electronic device may estimate the current location of the electronic device using a triangulation scheme. As yet another example, the electronic device may estimate the current location of the electronic device using a WLAN service.

After estimating the current location of the electronic device in step 401, the electronic device proceeds to step 403. In step 403, the electronic device estimates an estimated elapsed time from the current location to location information included in the schedule information settable as the destination for navigation service. For example, when schedule information 501 for a buyer meeting in Incheon International Airport at 21:00 on January 30th 2012 as illustrated in FIG. 5A is settable as a destination for navigation service, the electronic device estimates an estimated elapsed time from a current location to Incheon International Airport that is location information 503 included in the schedule information 501 settable as the destination for navigation service.

After estimating the estimated elapsed time up to the location information included in the schedule information in step 403, the electronic device proceeds to step 405. In step 405, the electronic device confirms the remaining time from the present time to the schedule information. For example, when schedule information 501 for a buyer meeting in Incheon International airport at 21:00 on Jan. 30, 2012 illustrated as in FIG. 5A is settable as a destination for navigation service, the electronic device confirms the remaining time from the present time 511 to 21:00 Jan. 30, 2012 that is the schedule information 501.

Next, the electronic device proceeds to step 407. In step 407, the electronic device compares the estimated elapsed time from the current location to the location information included in the schedule information and the remaining time from the present time to the schedule information. For example, the electronic device determines whether the estimated elapsed time from the current location to the location information included in the schedule information is less than the remaining time from the present time to the schedule information.

If the estimated elapsed time from the current location to the location information included in the schedule information is greater than or equal to the remaining time from the present time to the schedule information in step 407, the electronic device recognizes that it cannot set the destination for navigation service using the schedule information. According to this, the electronic device proceeds to step 209 of FIG. 2 in which the electronic device determines whether a destination setting event occurs.

In contrast, if the estimated elapsed time from the current location to the location information included in the schedule information is less than the remaining time from the present time to the schedule information in step 407, the electronic device proceeds to step 409. In step 409, the electronic device sets the destination for navigation service considering the schedule information. For example, when the estimated elapsed time from the current location to the location information included in the schedule information 501 as illustrated in FIG. 5A is less than the remaining time from the present time to the schedule information, the electronic device sets Incheon International airport that is the location information 503 included in the schedule information 501, as the destination 505 for navigation service as illustrated in FIG. 5B. At this time, the electronic device displays a navigation service screen including a destination list 507 settable as a destination for navigation service, a current location 509 of the electronic device, the present time 511, the destination 505 for navigation service and the like as illustrated in FIG. 5B.

Thereafter, the electronic device terminates the algorithm according to exemplary embodiments of the present invention.

In the aforementioned exemplary embodiment of the present invention, after estimating an estimated elapsed time from a current location to location information included in schedule information in steps 401 and 403, the electronic device confirms the remaining time from the present time to the schedule information in step 405. At this time, the electronic device performs a process of estimating the estimated elapsed time from the current location to the location information included in the schedule information in steps 401 and 403 in parallel with a process of confirming the remaining time from the present time to the schedule information in step 405. According to this, after confirming the remaining time from the present time to the schedule information in step 405, the electronic device may estimate the estimated elapsed time from the current location to the location information included in the schedule information in steps 401 and 403.

In the aforementioned exemplary embodiment of the present invention, the electronic device sets the destination for navigation service considering the estimated elapsed time up to the location information included in the schedule information. At this time, the electronic device sets the destination for navigation service considering a plurality of schedule information as illustrated in FIG. 6 below.

Figure 7A:
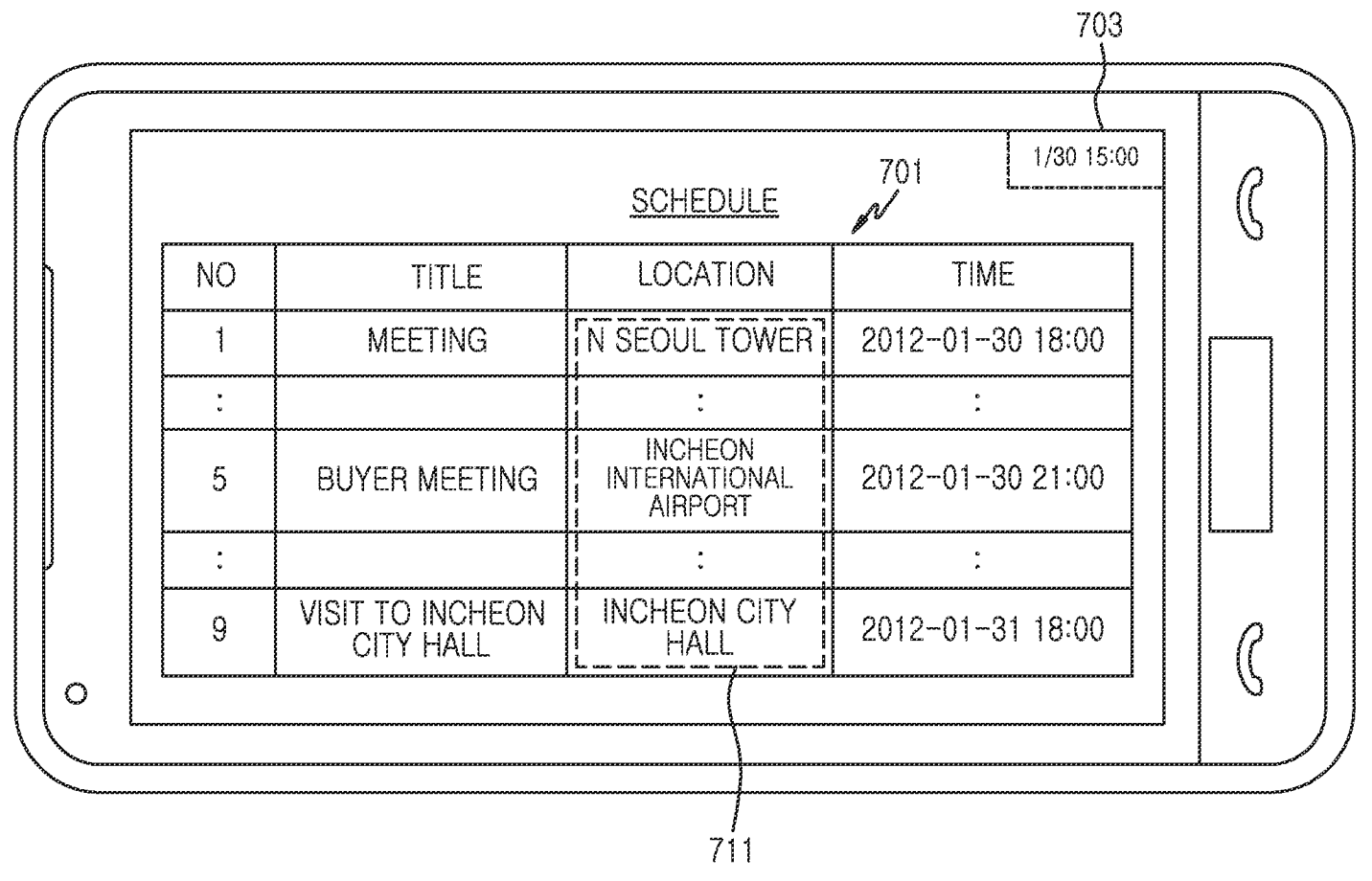
Figure 7B:
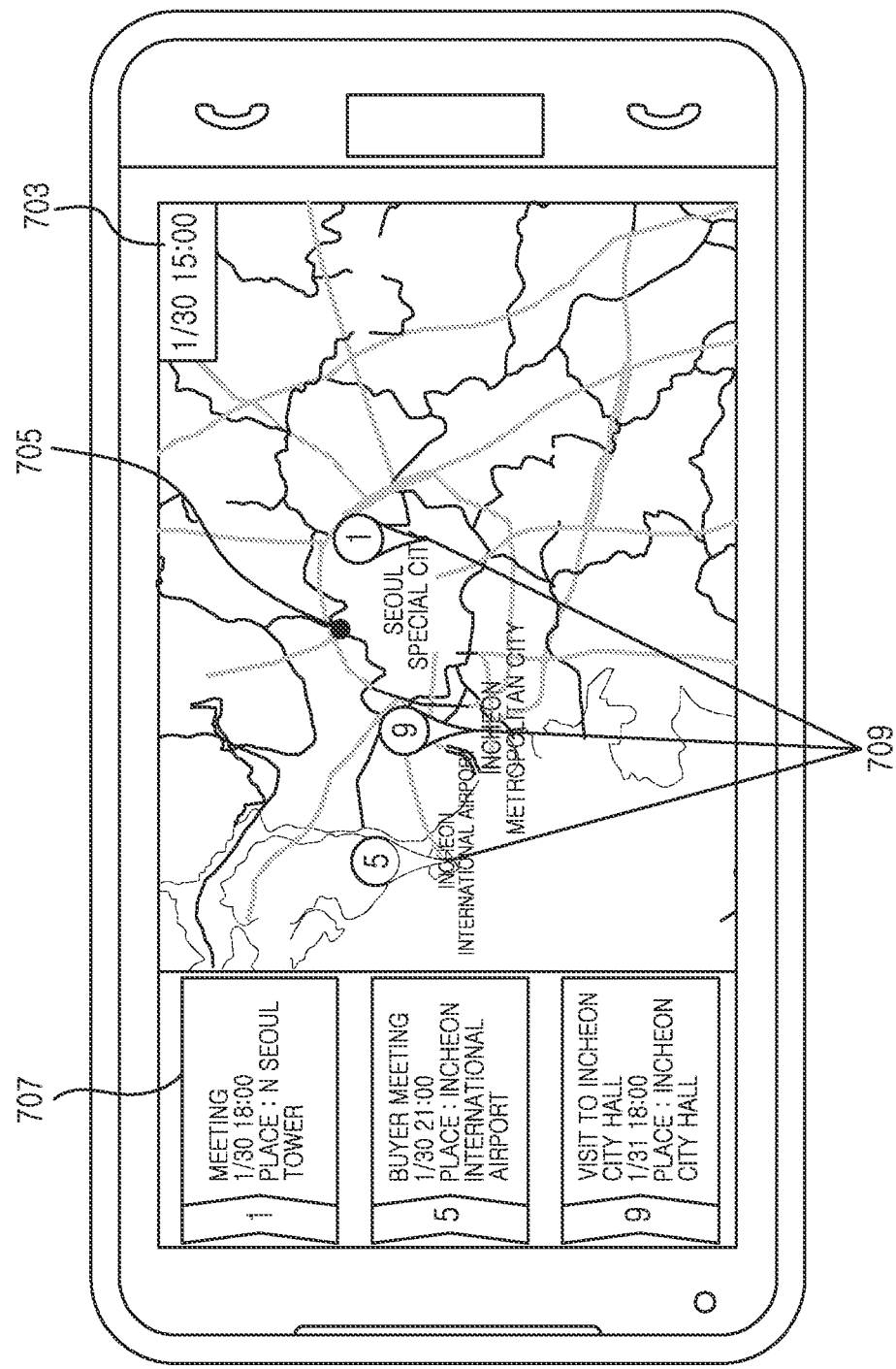
Figure 7C:
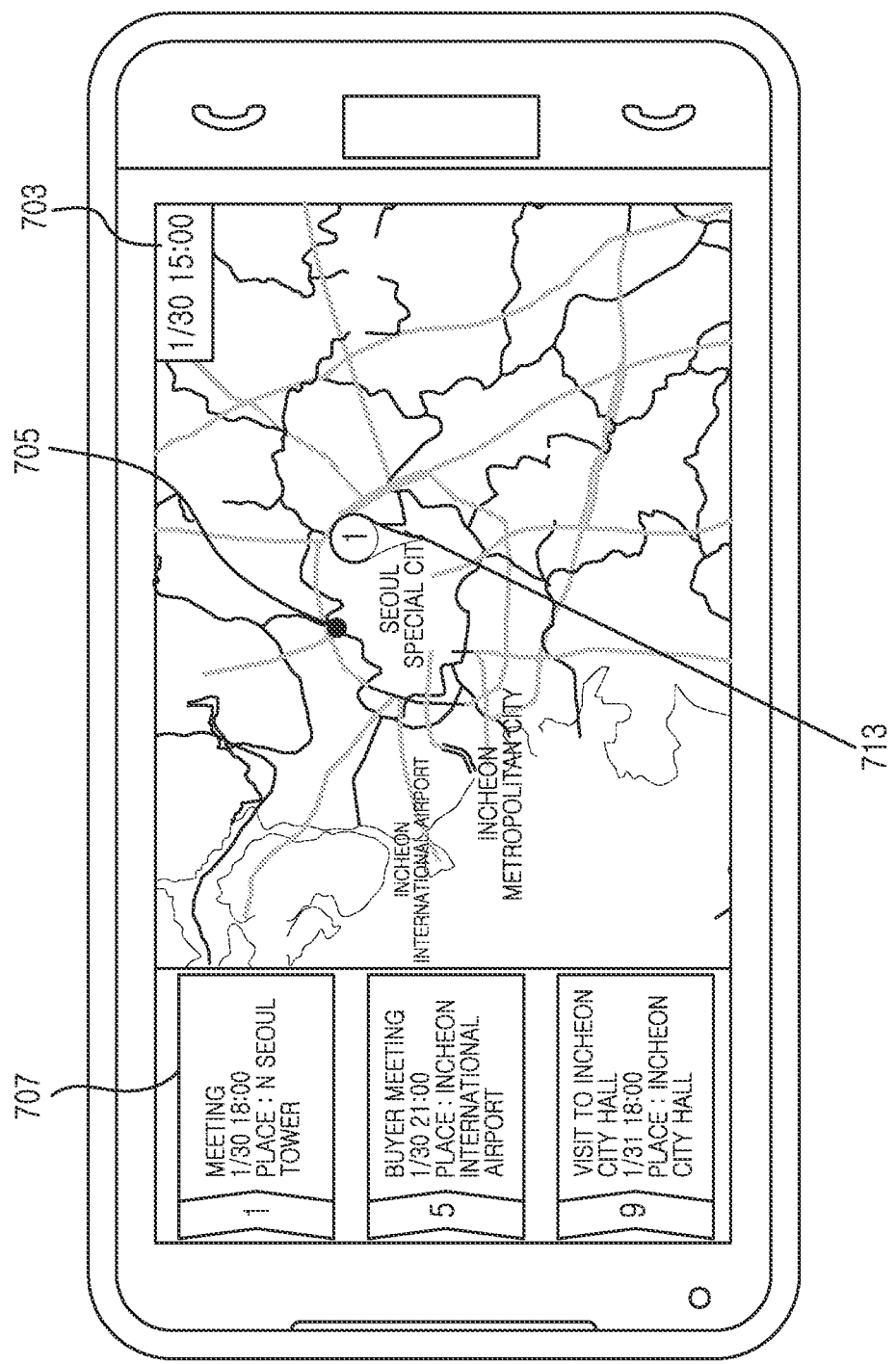

FIG. 6 illustrates a procedure for setting a destination for navigation service considering schedule information in an electronic device according to a third exemplary embodiment of the present invention. FIGS. 7A to 7C are diagrams illustrating a screen configuration for setting a destination for navigation service in an electronic device according to the third exemplary embodiment of the present invention.

Referring to FIGS. 6, and 7A to 7C, if the electronic device determines that schedule information settable as a destination for navigation service exists in step 205 of FIG. 2, then in step 601, the electronic device estimates a current location of the electronic device. For example, the electronic device estimates the current location of the electronic device using a satellite signal received from a GNSS satellite. As another example, the electronic device can estimate the current location of the electronic device using a triangulation scheme. As yet another example, the electronic device may estimate the current location of the electronic device using a WLAN service.

After estimating the current location of the electronic device in step 601, the electronic device proceeds to step 603. In step 603, the electronic device confirms the number (Sn) of schedule information after the present time among the schedule information. For example, when assuming that the number of schedule information 701 included in the list of schedule information 711 that occurs after the present time 703 among the schedule information is equal to '9' as illustrated in FIG. 7A, the 'Sn' is set to '9'.

After confirming the number (Sn) of schedule information after the present time in step 603, the electronic device proceeds to step 605. In step 605, the electronic device estimates an estimated elapsed time from a current location to location information included in ith schedule information among the schedule information after the present time confirmed in step 603. For example, when the 'i' is equal to '1', the electronic device estimates an estimated elapsed time from a current location to 'N' Seoul Tower, which is location information included in the first schedule information illustrated in FIG. 7A. Here, the 'i' represents an index for schedule information for navigation service. At this time, the 'i' has an initial value of 1.

After estimating the estimated elapsed time from the current location to the location information included in the ith schedule information in step 605, the electronic device proceeds to step 607. In step 607, the electronic device confirms the remaining time from the present time to the ith schedule information. For example, when the 'i' is equal to '1', the electronic device confirms the remaining time from the present time to 18:00 Jan. 30, 2012 of the first schedule information illustrated in FIG. 7A.

Next, the electronic device proceeds to step 609. In step 609, the electronic device compares the estimated elapsed time from the current location to the location information included in the ith schedule information and the remaining time from the present time to the ith schedule information. For example, the electronic device determines whether the estimated elapsed time from the current location to the location information included in the ith schedule information is less than the remaining time from the present time to the ith schedule information.

If the electronic device determines that the estimated elapsed time from the current location to the location information included in the ith schedule information is not less than the remaining time from the present time to the ith schedule information in step 609, then the electronic device proceeds to step 613.

If the electronic device determines that the estimated elapsed time from the current location to the location information included in the ith schedule information is less than the remaining time from the present time to the ith schedule information in step 609, the electronic device proceeds to step 611. In step 611, the electronic device adds the ith schedule information to a settable destination list for navigation service.

Next, the electronic device proceeds to step 613. In step 613, the electronic device compares the index (i) for schedule information and the number (Sn) of schedule information. For example, the electronic device determine whether the index (i) for the schedule information is greater than or equal to the number (Sn) of schedule information.

If the index (i) for the schedule information is less than the number (Sn) of schedule information in step 613, the electronic device proceeds to step 621. In step 621, the electronic device updates the index (i) for the schedule information (i++).

Next, the electronic device proceeds to step 605 and estimates an estimated elapsed time from the current location to location information included in ith schedule information. For example, when the 'i' is equal to 5, the electronic device estimates an estimated elapsed time from the current location to Incheon International airport, which is location information included in the fifth schedule information.

In contrast, if the schedule information index (i) is greater than or equal to the number (Sn) of schedule information in step 613, the electronic device recognizes that it has compared all the estimated elapsed time from the current location to the location information included in the ith schedule information and the remaining time from the present time to the ith schedule information. According to this, the electronic device proceeds to step 615. and In step 615, the electronic device determines whether schedule information exists in the settable destination list.

If the electronic device determines that the schedule information does not exist in the settable destination list in step 615, the electronic device recognizes that it cannot set the destination for navigation service using the schedule information. According to this, the electronic device proceeds to step 209 of FIG. 2 and determines whether a destination setting event occurs.

In contrast, if the electronic device determines that the schedule information exists in the settable destination list in step 615, the electronic device proceeds to step 617. In step 617, the electronic device displays a settable destination list for navigation service. For example, when the first schedule information, the fifth schedule information, and the ninth schedule information among the schedule information illustrated in FIG. 7A are included in the destination list, the electronic device displays a destination list 707 including the first schedule information, the fifth schedule information, and the ninth schedule information as illustrated in FIG. 7B. At this time, the electronic device may display, on a map, location information 709 about the first schedule information, the fifth schedule information, and the ninth schedule information included in the destination list 707.

After displaying the settable destination list for navigation service in step 617, the electronic device proceeds to step 619. In step 619, the electronic device sets at least one destination, which is selected by a user from the displayed destination list, as the destination for navigation service. For example, if the first schedule information is selected from the settable destination list in step 707 illustrated in FIG. 7B, the electronic device sets 'N' Seoul Tower 713, which is the first schedule information, as a destination for navigation service on the display unit 112 as illustrated in FIG. 7C. At this time, as illustrated in FIG. 7C, the electronic device displays a navigation service screen including the destination list 707 settable as the destination for navigation service, a current location 705 of the electronic device, the present time 703, the destination 713 for navigation service and the like. If another destination other than the destination set as the destination for navigation service is selected from the settable destination list 707 for navigation service, the electronic device may convert the destination for navigation service to the selected other destination.

After that, the electronic device terminates the algorithm according to the present invention.

In the aforementioned exemplary embodiment of the present invention, the electronic device sets a destination for navigation service considering a destination selected by a user from a settable destination list for navigation service.

In another exemplary embodiment of the present invention, the electronic device may set a destination for navigation service according to the priority order among a settable destination list for navigation service.

FIG. 8 illustrates a procedure for setting a destination for navigation service considering schedule information in an electronic device according to an exemplary embodiment of the present invention.

Referring to FIG. 8, if the electronic device determines that schedule information settable as a destination for navigation service exists in step 205 of FIG. 2, then in step 801, the electronic device estimates a current location of the electronic device. For example, the electronic device estimates the current location of the electronic device using a satellite signal received from a GNSS satellite. As another example, the electronic device can estimate the current location of the electronic device using a triangulation scheme. As yet another example, the electronic device may estimate the current location of the electronic device using a WLAN service.

After estimating the current location of the electronic device in step 801, the electronic device proceeds to step 803. In step 803, the electronic device confirms the number (Sn) of schedule information after the present time among the schedule information. For example, when assuming that the number of schedule information 701 after the present time 703 among the schedule information is equal to '9' as illustrated in FIG. 7A, the 'Sn' is set to '9'.

After confirming the number (Sn) of schedule information after the present time in step 803, the electronic device proceeds to step 805. In step 805, the electronic device estimates an estimated elapsed time from a current location to location information included in ith schedule information among the schedule information after the present time confirmed in step 803. For example, when the 'i' is equal to '1', the electronic device estimates an estimated elapsed time from a current location to 'N' Seoul Tower, which is location information included in the first schedule information illustrated in FIG. 7A. The 'i' represents an index for schedule information for navigation service. At this time, the 'i' has an initial value of 1.

After estimating the estimated elapsed time from the current location to the location information included in the ith schedule information in step 805, the electronic device proceeds to step 807. In step 807, the electronic device confirms the remaining time from the present time to the ith schedule information. For example, when the 'i' is equal to '1', the electronic device confirms the remaining time from the present time to 18:00 January 30th of the first schedule information illustrated in FIG. 7A.

Next, the electronic device proceeds to step 809. In step 809, the electronic device compares the estimated elapsed time from the current location to the location information included in the ith schedule information and the remaining time from the present time to the ith schedule information. For example, the electronic device determines whether the estimated elapsed time from the current location to the location information included in the ith schedule information is less than the remaining time from the present time to the ith schedule information.

If the electronic device determines that the estimated elapsed time from the current location to the location information included in the ith schedule information is not less than the remaining time from the present time to the ith schedule information in step 809, the electronic device proceeds to step 813.

If the electronic device determines that the estimated elapsed time from the current location to the location information included in the ith schedule information is less than the remaining time from the present time to the ith schedule information in step 809, the electronic device proceeds to step 811. In step 811, the electronic device adds the ith schedule information to a settable destination list for navigation service.

Next, the electronic device proceeds to step 813. In step 813, the electronic device compares an index (i) for schedule information and the number (Sn) of schedule information. For example, the electronic device determines whether the index (i) for the schedule information is greater than or equal to the number (Sn) of schedule information.

If the electronic device determines that the index (i) for the schedule information is less than the number (Sn) of schedule information in step 813, the electronic device proceeds to step 821. In step 821, the electronic device updates the index (i) for the schedule information (i++).

Next, the electronic device proceeds to step 805 and estimates the estimated elapsed time from the current location to location information included in ith schedule information. For example, when the 'i' is equal to 5, the electronic device estimates an estimated elapsed time from the current location to Incheon International airport, which is location information included in the fifth schedule information.

In contrast, if the electronic device determines that the schedule information index (i) is greater than or equal to the number (Sn) of schedule information in step 813, the electronic device recognizes that it has compared all the estimated elapsed time from the current location to the location information included in the ith schedule information and the remaining time from the present time to the ith schedule information. According to this, the electronic device proceeds to step 815. In step 815, the electronic device determines whether schedule information exists in the settable destination list.

If the electronic device determines that the schedule information does not exist in the settable destination list in step 815, the electronic device recognizes that it cannot set a destination for navigation service using schedule information. According to this, the electronic device proceeds to step 209 of FIG. 2 and determines whether a destination setting event occurs.

In contrast, if the electronic device determines that the schedule information exists in the settable destination list in step 815, the electronic device proceeds to step 817. In step 817, the electronic device sorts the settable destination list for navigation service according to the priority order. For example, the electronic device sorts schedule information included in the settable destination list for navigation service considering a distance from a current location to location information included in the schedule information. As another example, the electronic device can sort the schedule information included in the settable destination list for navigation service considering an estimated elapsed time from the current location to the location information included in the schedule information. As yet another example, the electronic device may sort the schedule information included in the settable destination list for navigation service considering the remaining time from the present time to the schedule information.

After sorting the settable destination list according to the priority order in step 817, the electronic device proceeds to step 819. In step 819, the electronic device sets a destination for navigation service using the schedule information of the highest priority order in the sorted settable destination list. For example, when sorting considering the distance from the current location to the location information included in the schedule information, the electronic device sets the destination for navigation service using schedule information having the shortest distance from the current location to the location information included in the schedule information. As another example, when sorting considering the estimated elapsed time from the current location to the location information included in the schedule information, the electronic device can set the destination for navigation service using schedule information having the shortest estimated elapsed time from the current location to the location information included in the schedule information. For further another example, when sorting considering the remaining time from the present time to the schedule information, the electronic device may set the destination for navigation service using the schedule information having the shortest remaining time from the present time to the schedule information.

Thereafter, the electronic device terminates the algorithm according to exemplary embodiments of the present invention.

As described above, there is an advantage that, although not directly setting a destination for navigation service, a user can automatically set the destination for navigation service considering schedule information, by setting the destination for navigation service considering the schedule information in an electronic device.

It will be appreciated that exemplary embodiments of the present invention according to the claims and description in the specification can be realized in the form of hardware, software or a combination of hardware and software.

Any such software may be stored in a non-transient computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention.

Accordingly, exemplary embodiments of the present invention provide a program comprising code for implementing apparatus or a method as claimed in any one of the claims of this specification and a machine-readable storage storing such a program. Still further, such programs may be conveyed electronically via any medium such as a communication signal carried over a wired or wireless connection and exemplary embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing navigation service in an electronic device, the method comprising:
    providing, by a controller, a user menu for setting a link between schedule information and a navigation service;
    selecting, by the controller, at least one schedule information including a location from among a plurality of schedule information;
    obtaining, by the controller, an estimated elapsed time from a current location of the electronic device to each location included in each of the at least one schedule information;
    providing, by the controller, at least one candidate schedule information from among the at least one schedule information as a destination for the navigation service based on the estimated elapsed time; and
    providing, by the controller, the navigation service based on the at least one candidate schedule information,
    wherein the providing the navigation service based on the at least one candidate schedule information comprises setting a destination for the navigation service based on the location included in the at least one candidate schedule information, and
    wherein the providing at least one candidate schedule information among the at least one schedule information as a destination for a navigation service based on the estimated elapsed time comprises:

obtaining a remaining time from a present time to each time included in each of the at least one schedule information, comparing the estimated elapsed time and the remaining time to the at least one schedule information, and providing at least one candidate schedule information including possible arrival destinations within the remaining time based on the comparison result.

2. The method of claim 1, wherein the selecting at least one schedule information including a location from among a plurality of schedule information comprises selecting at least one schedule information after the present time from among the plurality of schedule information.

3. The method of claim 1, wherein the location comprises at least one of a Global Navigation Satellite System (GNSS) coordinate, a latitude, an altitude, an address, and a place name.

4. The method of claim 1, wherein the current location of the electronic device estimates using at least one of a satellite signal received from a GNSS satellite, a triangulation scheme, and a Wireless Local Area Network (WLAN) service.

5. The method of claim 1, wherein the providing at least one candidate schedule information comprises:

displaying a list of at least one candidate schedule information among the at least one schedule information as a destination for a navigation service based on the estimated elapsed time; and selecting at least one candidate schedule information from the list.

6. The method of claim 1, wherein the providing the navigation service based on the at least one of candidate comprises:

detecting a priority order of the at least one candidate schedule information; and setting a destination for navigation service using the at least one candidate schedule information according to the detected priority order.

7. The method of claim 6, wherein the priority order is determined based on at least one of a distance from the current location of the electronic device to location included in the candidate schedule information, an estimated elapsed time from the current location of the electronic device to the location included in the candidate schedule information, and a remaining time to the candidate schedule information of the electronic device.

8. An electronic device for providing navigation service, the electronic device comprising:

a controller configured to provide a user menu for setting a link between schedule information and a navigation service;

a storage unit configured to store a plurality of schedule information; and a navigation module configured to select at least one schedule information including a location from among the plurality of schedule information, to obtain an estimated elapsed time from a current location of the electronic device to each location included in each of the at least one schedule information, to provide at least one candidate schedule information from among the at least one schedule information as a destination for the navigation service based on the estimated elapsed time, and to provide the navigation service based on the at least one candidate schedule information, wherein the navigation module is configured to set a destination for the navigation service based on the location included in the at least one candidate schedule information stored in the storage unit, and wherein the navigation module is further configured to:
obtain a remaining time from a present time to each time included in each of the at least one schedule information, compare the estimated elapsed time and the remaining time to the at least one schedule information, and provide at least one candidate schedule information including possible arrival destinations within the remaining time based on the comparison result.

9. The device of claim 8, wherein the navigation module is configured to select at least one schedule information after the present time from among the plurality of schedule information in the storage unit.

10. The device of claim 8, wherein the location comprises at least one of a Global Navigation Satellite System (GNSS) coordinate, a latitude, an altitude, an address, and a place name.

11. The device of claim 8, wherein the current location of the electronic device estimates using at least one of a satellite signal received from a GNSS satellite, a triangulation scheme, and a Wireless Local Area Network (WLAN) service.

12. The device of claim 8, further comprising a display unit configured to display a list of at least one candidate schedule information from among the at least one schedule information as a destination for a navigation service based on the estimated elapsed time, wherein the navigation module is configured to select at least one candidate schedule information from the list displayed on the display unit.

13. The device of claim 8, wherein the navigation module is configured to detect a priority order of the at least one candidate schedule information, and to set a destination for navigation service using the at least one candidate schedule information according to the detected priority order.

14. The device of claim 13, wherein the priority order is determined based on at least one of a distance from the current location of the electronic device to location included in the candidate schedule information, an estimated elapsed time from the current location of the electronic device to the location included in the candidate schedule information of the electronic device.

* * * * *